April 10, 1928.

C. C. CARPENTER 1,665,772

STORAGE BATTERY CONSTRUCTION

Filed Feb. 9, 1918

WITNESS:
Fay E. Bronk
Ralph Munden

INVENTOR.
Campbell C. Carpenter.
BY
Raymond H Van Vust.
ATTORNEY.

Patented Apr. 10, 1928.

1,665,772

UNITED STATES PATENT OFFICE.

CAMPBELL C. CARPENTER, OF NIAGARA FALLS, NEW YORK, ASSIGNOR TO U. S. LIGHT & HEAT CORPORATION, OF NIAGARA FALLS, NEW YORK, A CORPORATION OF NEW YORK.

STORAGE-BATTERY CONSTRUCTION.

Application filed February 9, 1918. Serial No. 216,144.

The present invention relates to storage battery construction.

In storage batteries it is common to connect the plates of one polarity to a cell post, while the plates of opposite polarity are connected to a similar cell post, which cell posts extend through a part of the cell to provide an outside connection. Inasmuch as there is considerable vibration between the cell and the plates within said cell, a great deal of difficulty has been experienced, due to the creepage of electrolyte along the cell posts, caused by such vibration.

An object of the present invention is to provide improved means for sealing the cell post to the cell whereby creepage of the electrolyte above referred to will be effectually prevented.

A further object is to provide a construction wherein a gasket may be employed between the post and the part of the cell through which said post extends, whereby to effectually seal said cell.

A further object is to provide a construction which is cheap and which is simple to assemble and disassemble.

Further objects will appear as the description proceeds.

Referring to the drawings.

Figure 1:
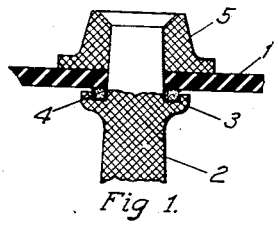
Figure 1 represents in sectional elevation part of a storage battery cell, together with a cell post extending therethrough, with improved means for sealing said cell to prevent the escape of electrolyte according to the present invention.

Referring first to Figure 1, a part of a battery cell is indicated by the numeral 1. This part may be the cover of the cell, though it is immaterial as far as the present invention is concerned, whether the cell posts extend through the cover or any other part of the cell. The cell post is indicated by the numeral 2. The cell post 2 is provided with an annular outstanding portion 3 which is adapted to hold an annular gasket 4 in engagement with the part 1. Mounted on the opposite side of part 1 is a link 5 which should fit down over the cell post 2 with a sufficiently loose fit to permit the compression of the gasket 4.

In assembling the cell post within the part 1, pressure will be exerted downwardly on the link 5 whereby to put the gasket 4 under suitable compression. The link 5 will then be burned to the cell post 2 in the ordinary manner, whereby to be integrally united therewith. Inasmuch as the gasket 4 is held tightly against the under side of the part 1, it will form an annular seal whereby to prevent creepage of electrolyte out of the cell around the post 2.

Figure 3:
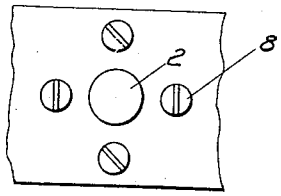
Figures 2 and 3 represent a modification in sectional elevation and plan respectively.
Figure 6:
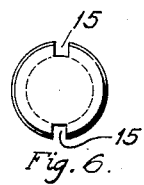
Figures 5, 6, 7 and 8 show details of a further modification.
Figure 2:
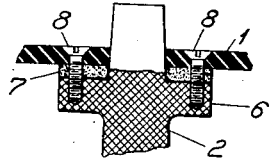

According to the embodiment of the present invention illustrated in Figures 2 and 3, the cell post 2 is provided with an annular shoulder 6. Between the shoulder 6 and the part 1 of the cell is located a gasket 7 which should be of annular form surrounding the cell post 2. The gasket 7 will be held in a state of compression between the shoulder 6 and the part 1 of the cell by means of a plurality of screws, 8, 8. Said screws 8, 8, should be located within the boundary of the gasket 7 whereby said gasket 7 will form an effective seal. Furthermore, the screw holes for the screws 8, 8, should not extend entirely through the shoulder 6. Otherwise, electrolyte might escape around said screws 8, 8.

Figure 4:
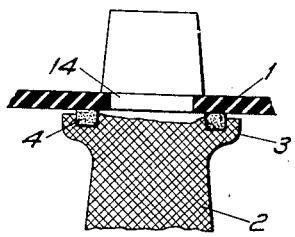
Figure 4 represents a further modification.

According to Figure 4, the cell post 2 is provided with an annular outstanding portion 3, similar to that shown in Fig. 1. Said outstanding portion 3 is adapted to hold the gasket 4. The cell post 2 is provided with a circular slot 14 into which the part 1 will be locked. In mounting the part 1 on the cell post 2 according to the embodiment of the invention illustrated in Figure 4, the part 1 will be softened by the local application of heat around the region which is to be mounted in the slot 14. Due to the softening of the part 1, the cell post may be readily forced therethrough and locked, with the upper shoulder provided by the slot 14 resting upon the upper part of the part 1. When the parts are assembled in this position, the gasket 4 should be in a state of compression.

Figure 5:
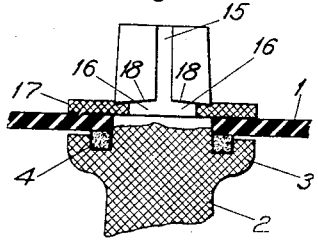
Figure 7:
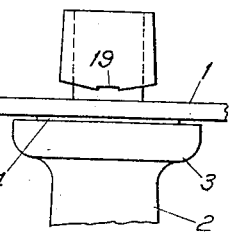
Figure 8:
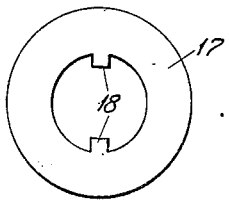

According to Figures 5 to 8, the cell post is adapted to be tightly secured to the part 1 by means of a bayonet catch. As shown in Figure 5, the cell post is provided with an annular outstanding portion 3 which holds a gasket 4, as in Fig. 1. Above the part 1 the cell post may be provided with a pair of longitudinal slots 15, each of which communicates with a slot 16 extending at an angle to the slot 15. A nut 17 will be provided having a pair of teeth 18, 18, adapted to ride in the slots 15. In mounting the nut 17 on the cell post, said nut 17 may be turned through a part of a revolution when the teeth 18, 18, are in proximity to the slots 16, 16, whereby the nut 17 will be locked against movement longitudinally of the cell post 2, after the manner of a bayonet catch. If it should be considered desirable, the upper shoulders 18, 18, provided by the slots 16, 16, may be given a slight pitch, whereby turning of the nut 17 will force said nut downwardly. A small notch 19 may be provided in each of the shoulders 18, 18, if desired, in order to lock the nut against circular movement. According to the disclosure in Figures 5 to 8, the nut may be turned in either a clockwise or counter-clockwise direction for locking. Obviously, it is not necessary to provide more than one of these possibilities. It is also obvious that the showing of teeth and slots on post and nut may be reversed, if desired. Furthermore, the pitch to the shoulders 18 and also the notch 19 may be omitted, if desired. When the term "bayonet catch" is used herein, it is intended to cover broadly the construction of tooth and co-operating angularly placed slots.

The member 2 with its annular outstanding portion, need not be solid in construction, but may be provided with a longitudinally extending hole whereby to serve as an adapter to be mounted over the ordinary cell post.

When the nut 17 is moved to its locked position, the gasket 4 should be in a state of compression, whereby to form a tight seal. In disassembling the parts according to the disclosure in Figures 5 to 8, it will be necessary only to release the bayonet catch, when the parts may be readily taken apart.

The described embodiments are chosen merely for the purpose of illustration. Many modifications will occur to those skilled in the art. It is intended in this patent to cover all such modifications that fall within the scope of the invention as defined by the appended claims.

What I claim as new and desire to secure by Letters Patent of the United States is—

1. In a battery terminal fastening, a terminal post having lugs and flat sides connecting the lugs, and a nut having a slot shaped to receive the lugs and pass down the flat sides, one of said elements having diagonally disposed inclined faces at points of contact with the other element, whereby the nut and lugs are wedged together when the nut is turned and swung under the lugs.

2. In a battery terminal fastening, a terminal post having recesses, and a nut having a slot and having its upper face in engagement with the upper face of each recess when said nut is turned, one of said faces being inclined, whereby the nut and post are wedged.

3. In a storage battery having a jar cover and a cell terminal post extending through an opening in the cover and provided with a flange having a gasket between it and the cover, the combination with a connector sleeved onto the cell terminal post and between which and the flange the cover and gasket are gripped to form a seal, of a burned or lead-puddled joint provided between the connector and the terminal portion of the post to hold the parts in fixed sealed relation.

4. In a storage battery having a jar cover and a cell terminal post extending through an opening in the cover and provided with an abutment between it and the cover, the combination with a connector sleeved onto the cell terminal post and between which and the abutment the cover is gripped to form a seal, of a burned or lead-puddled joint provided between the connector and the terminal portion of the post to hold the parts in fixed sealed relation.

5. The method of sealing a storage battery flanged cell terminal post through a jar cover which consists in stringing a gasket and the cover and a connector on the post, gripping the cover and gasket between the flange of the post and the connector by pressing the same toward each other, and lead burning or puddling the connector and the terminal part of the post while the parts are pressed, substantially as described.

6. The method of sealing a storage battery cell terminal post through a jar cover which consists in stringing the cover and a connector on the post having an abutment, gripping the cover and gasket between the abutment of the post and the connector by pressing the same toward each other, and lead burning or puddling the connector and the terminal part of the post while the parts are pressed, substantially as described.

In witness whereof, I have hereunto subscribed my name.

CAMPBELL C. CARPENTER.